(12) United States Patent
Appel et al.

(10) Patent No.: US 10,171,442 B2
(45) Date of Patent: Jan. 1, 2019

(54) PREDICTING A NEED FOR AND CREATING TEMPORARY ACCESS TO A COMPUTER COMPONENT IN INFRASTRUCTURE INFORMATION TECHNOLOGY

(71) Applicant: International Business Machines Corporation, Armonk, NY (US)

(72) Inventors: Ana P. Appel, Sao Paulo (BR); Marcos V. Landivar Paraiso, Campinas (BR); Edson G. Pereira, Cotia (BR); Sergio Varga, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 15/237,925

(22) Filed: Aug. 16, 2016

(65) Prior Publication Data
US 2018/0054428 A1     Feb. 22, 2018

(51) Int. Cl.
| | | |
|---|---|---|
| *H04L 29/06* | (2006.01) | |
| *G06Q 30/00* | (2012.01) | |
| *H04L 9/32* | (2006.01) | |

(52) U.S. Cl.
CPC ............ *H04L 63/08* (2013.01); *H04L 63/108* (2013.01)

(58) Field of Classification Search
CPC ....... H04L 63/08; H04L 63/102; H04L 63/10; G06Q 10/063112; G06Q 10/1053; G06F 21/6218
USPC .......................................................... 726/2–7
See application file for complete search history.

(56) References Cited

U.S. PATENT DOCUMENTS

| | | | |
|---|---|---|---|
| 7,558,822 B2 | 7/2009 | Fredricksen et al. | |
| 7,630,948 B2 | 12/2009 | Friedlander et al. | |
| 7,792,786 B2 | 9/2010 | Chen et al. | |
| 9,037,700 B2 | 5/2015 | Agrawal et al. | |
| 9,923,927 B1* | 3/2018 | McClintock | ............ H04L 63/20 |

(Continued)

OTHER PUBLICATIONS

Demartini, G., "Finding Experts Using Wikipedia", 2nd International ExpertFinder Workshop (FEWS 2007), Jan. 2007, pp. 33-41.

(Continued)

*Primary Examiner* — Shanto Abedin
(74) *Attorney, Agent, or Firm* — Scully, Scott, Murphy & Presser, P.C.; David M. Quinn, Esq.

(57) ABSTRACT

A computer server may be monitored, and a request that requires executing an action on the computer server is received. Server configuration associated with the computer server is determined. Based on the server configuration, a technology associated with executing the action is determined. The action may be broken down into sub-activities and dependencies. A user profile database is searched to identify candidate users having a skill set associated with the technology. Availability, location and a skill level of the candidate users are determined. Based on historical data, a duration the candidate users would take to execute an activity on the computer server is predicted. Based on at least the duration, the availability, the location and the skill level of the candidate users, at least one user from the candidate users is determined to execute the activity on the computer server. A temporary access credential is provided for allowing access to the computer server during a specified duration.

15 Claims, 5 Drawing Sheets

(56) References Cited

U.S. PATENT DOCUMENTS

| | | |
|---|---|---|
| 2006/0047615 A1 | 3/2006 | Ravin et al. |
| 2006/0122875 A1* | 6/2006 | Kolbe .................... G06Q 10/06 705/321 |
| 2007/0136795 A1* | 6/2007 | Youn ................... H04L 63/0846 726/5 |
| 2007/0294092 A1* | 12/2007 | Calannio ................ G06Q 10/06 705/321 |
| 2009/0299993 A1* | 12/2009 | Novack .................. G06Q 10/06 |
| 2010/0262610 A1 | 10/2010 | Acosta et al. |
| 2014/0032254 A1* | 1/2014 | Della Corte ......... G06Q 30/016 705/7.14 |
| 2014/0181098 A1 | 6/2014 | Bhandari et al. |
| 2014/0279634 A1* | 9/2014 | Seeker ............... G06O 10/1053 705/321 |
| 2015/0161566 A1* | 6/2015 | Cai .................... G06Q 10/1053 705/321 |
| 2015/0356510 A1* | 12/2015 | Campesi ............ G06Q 10/1053 705/321 |
| 2016/0065585 A1* | 3/2016 | Della Corte .......... H04L 63/108 726/4 |
| 2016/0098665 A1 | 4/2016 | Skiba et al. |

OTHER PUBLICATIONS

Liu, X., et al., "Finding Experts in Community-Based Question-Answering Services", CIKM '05, Oct. 31-Nov. 5, 2005, 2 pages.
Thiagarajan, R., et al., "Finding Experts by Semantic Matching of User Profiles" To be presented at PICKME 2008, a ISWC Workshop, to be published in CEUR Workshop proceedings 2009, Oct. 2009, 14 pages.

* cited by examiner

US 10,171,442 B2

PREDICTING A NEED FOR AND CREATING TEMPORARY ACCESS TO A COMPUTER COMPONENT IN INFRASTRUCTURE INFORMATION TECHNOLOGY

FIELD

The present application relates generally to computers and computer applications, and more particularly to computer security.

BACKGROUND

The existing technologies with the growth of information technology (IT) solutions require specialized users that know in depth, the technology and the solution deployed for the technology. The existing complex and heterogeneous computing environments also call for an increase in support capabilities from different geographies, competencies, cultures and skills. In order to provide this type of support, the supporting users also need to be provided with credentials to access the computing environment. However, the size of the computing environment, the geographical dispersion of servers and equipments, the security policies and guidelines and the security controls may drive organizations to spend a great deal of effort and time in these activities.

One sensitive process in the IT service management is identification or identifier (ID) management. A lack of proper ID management and security policy can create security breaches and compromise an organization's computer environment. However, credentials are needed to provide computer environment support. In many situations only dedicated people are allowed to work in the servers due to a strict security policy. In other cases, the ID management is so controlled that enabling credential may require extensive controls and approvals, taking a long time until a support personnel can obtain a proper credential to begin working on computer environment.

BRIEF SUMMARY

A method and system of automatically provisioning temporary access to a computer component may be provided. The method may be performed by at least one hardware processor, and may include in one aspect, based on monitoring the computer server, receiving a signal comprising a request that requires executing an action on a computer server. The method may also include determining a server configuration associated with the computer server by accessing at least one storage device storing a configuration database. The method may further include determining based on the server configuration, a technology associated with executing the action on the computer server. The method may also include searching a user profile database stored on the at least one storage device to identify candidate users having a skill set associated with the technology. The method may further include determining availability, location and a skill level of the candidate users. The method may also include predicting based on historical data a duration the candidate users would take to execute the action on the computer server. The method may further include, based on at least the duration, the availability, the location and the skill level of the candidate users, determining at least one user from the candidate users to execute the action on the computer server. The method may also include creating a temporary access credential for the at least one user to access the computer server to execute the action, the temporary access credential having expiration duration.

A system of provisioning temporary access to a computer component, in one aspect, may include at least one hardware processor. The system may also include at least one storage device. The at least one hardware processor, based on monitoring the computer server, may receive a signal comprising a request that requires executing an action on a computer server. The at least one hardware processor may determine a server configuration associated with the computer server by accessing the at least one storage device storing a configuration database. The at least one hardware processor may determine based on the server configuration, a technology associated with executing the action on the computer server. The at least one hardware processor may search a user profile database stored on the at least one storage device to identify candidate users having a skill set associated with the technology. The at least one hardware processor may determine availability, location and a skill level of the candidate users. The at least one hardware processor may predict based on historical data a duration the candidate users would take to execute the action on the computer server. Based on at least the duration, the availability, the location and the skill level of the candidate users, the at least one hardware processor may determine at least one user from the candidate users to execute the action on the computer server. The at least one hardware processor may create a temporary access credential for the at least one user to access the computer server to execute the action. The temporary access credential may have expiration duration.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and technique may be provided that predict a need for a temporary access to an infrastructure component, for example, a computer server, computer storage device, computer network, based on a request. Examples of the request may include, but are not limited to, programmed changes, reports to computer-generated incidents or events, correction of problems, isolated or programmed activities and emergency tasks. In one embodiment, the method may include breaking down the request into smaller activities, creating a dependency of tasks to be executed, identifying capabilities and constraints needed for a user (e.g. a support administrator) to work on each task, identifying the most skilled and knowledgeable user or worker available to act on each task in the exact time and sequence that is needed and providing temporary credentials to the user or users.

The method in one embodiment is able to predict one or more users that will need to access a server, define the best order of the users based on the request that needs to be solved, availability of the users, for example, based on user's other activities such as vacation, task, work time, time it would take the user to address and solve a given request). The method in one embodiment may also predict the best time for a computer server or another computer component be brought down, for example, in case of programmatic change or activity, based on available resources. The method in one embodiment may also determine how much time the computer server or another computer component will be down based on this prediction.

The method in one embodiment allows for increase in availability of IT infrastructure; better use of resources within the organization; reduced time to act on requests; reduced effort for ID management, for example, expiration, policy, reset, lock and lock, and less number of IDs to be defined in the servers; provisioning IDs in a timely manner, and reducing or avoiding the time needed for a support team or administrator to identify the proper access; and better management of user IDs, for example, less IDs may be created.

Figure 1:
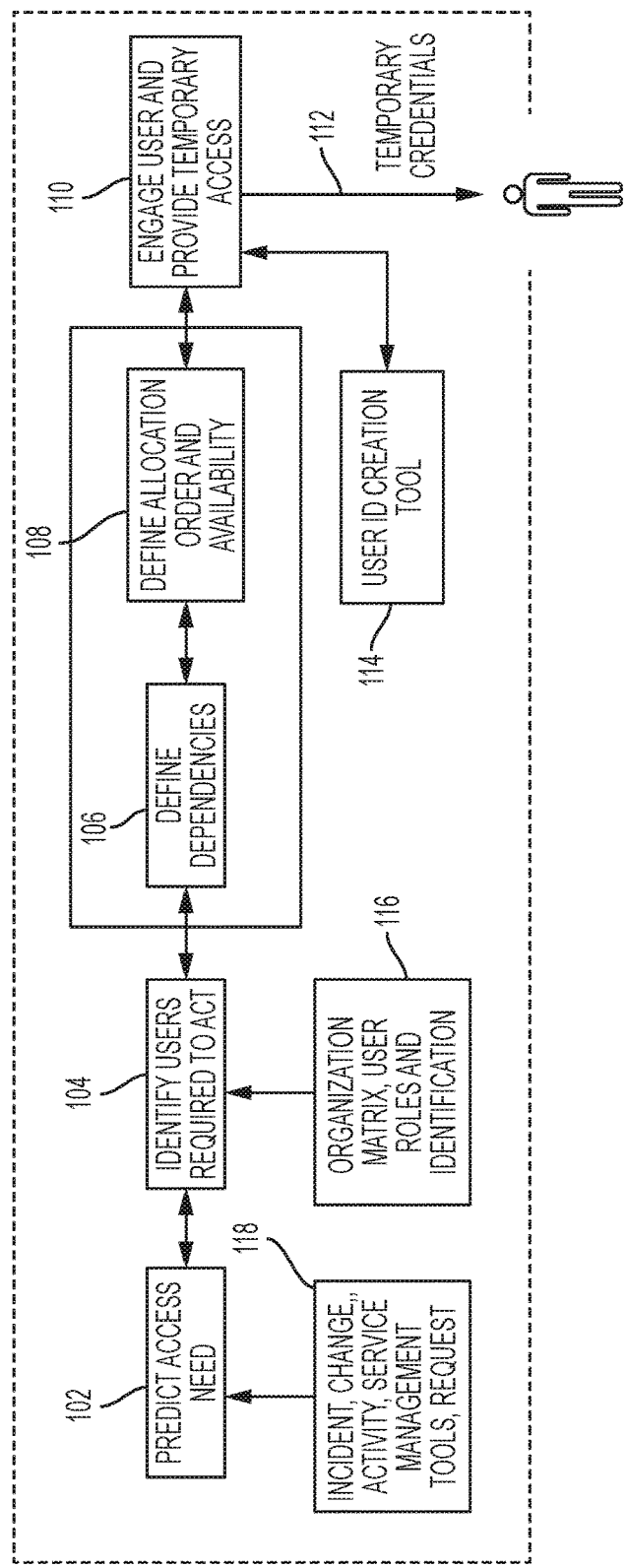
FIG. 1 is a diagram illustrating a method in one embodiment of the present disclosure.

FIG. 1 is a diagram illustrating a method in one embodiment of the present disclosure. At 102, for example, to identify a need for a user to access a computer server, the method in one embodiment of the present disclosure checks for, monitors for, or receives a request or requests from a plurality of tools or computer components that require a request to be solved or addressed, for example, require a user to perform an action on the computer server or act on the computer server. Those needs can be due to a change to be implemented, an incident to be fixed in a server, an alert from monitoring tool that requires attention, a programmatic action scheduled in the server, an isolated request, and/or other requests, for example, shown at 118. The request may also include information associated with the request, such as a server name, description of the request and a message with the request. In another aspect, based on the request, such information may be collected by a method of the present disclosure in one embodiment. With the request received and the associated information, the method in one embodiment categorizes the request and breaks the request into smaller activities. The processing at 102 outputs a list of skills needed to work on the request, the time period needed and the activities to be performed to resolve or service the request. The skills needed, the time period needed and the activities to be performed may be determined by analyzing historical data associated with similar requests and how and by which users those requests were addressed. Such historical data may be stored in a structural format in which a processor may retrieve attributes or attribute data field specifying the skills needed, the time period needed and the activities to be performed.

At 104, based on the need identified at 102, the method may identify candidate users that can address, solve or otherwise service or fulfill the request. For example, the method may access an organization's matrix, user directory or the like 116 for identifying users who can help based on their skills, experience and availability, and identify which user are the most adequate or best fit to work on the activity required to be performed for addressing the request. For instance, the method may leverage user's profile, user's skills, user's availability, historical data with information about user's activities, current assignments and any other enterprise or community knowledgebase to determine user's level of skill, previous experience with the request to be performed, knowledge of environment, and success rate at resolution of the request(s) that are similar to same as the received request. A list or a matrix may be created and ordered with a number of candidate users that can work on the request, for example, each activity determined at 102 to be performed for fulfilling the request. For example, available users that match the skills identified at 102 may be selected as candidate users.

At 106, the activities to be performed to fulfill the request are correlated and a dependency matrix or the like is created. Methods such as dependency graph, hierarchical analysis can be utilized to build a dependency map. Dependency matrix includes a list of activities to be performed to work on the request and specifies which one or more of the activities are a prerequisite to another activity.

At 108, with activities and dependencies mapped at 106 and all users identified at 104, the method may allocate the users to the activities based on their availability, skills, experience, and accessibility to the environment. Responsive to determining that there is a conflict, the method may propose another time to execute the task or change ticket. For instance, responsive to determining that there are no users available to execute the request at the requested time, a hardware processor may determine another time during which one or more of the users are available to execute the request. Based on a skill set of a user and the group of similar tasks (e.g., historical tasks and users who performed those tasks, and their skill set) a mapping of users is selected for each activity.

At 110, the method may include contacting the user or users selected at 108 and providing the user or users a notification with temporary credential 112 and information about the activities that need to be performed and all resources involved in performing the activities. For example, based on the mapping of users determined at 108, those users selected to perform the computer activities to act on the computer server may be given user IDs to access the computer server, via a user ID creation tool that creates the IDs 114.

Figure 2:
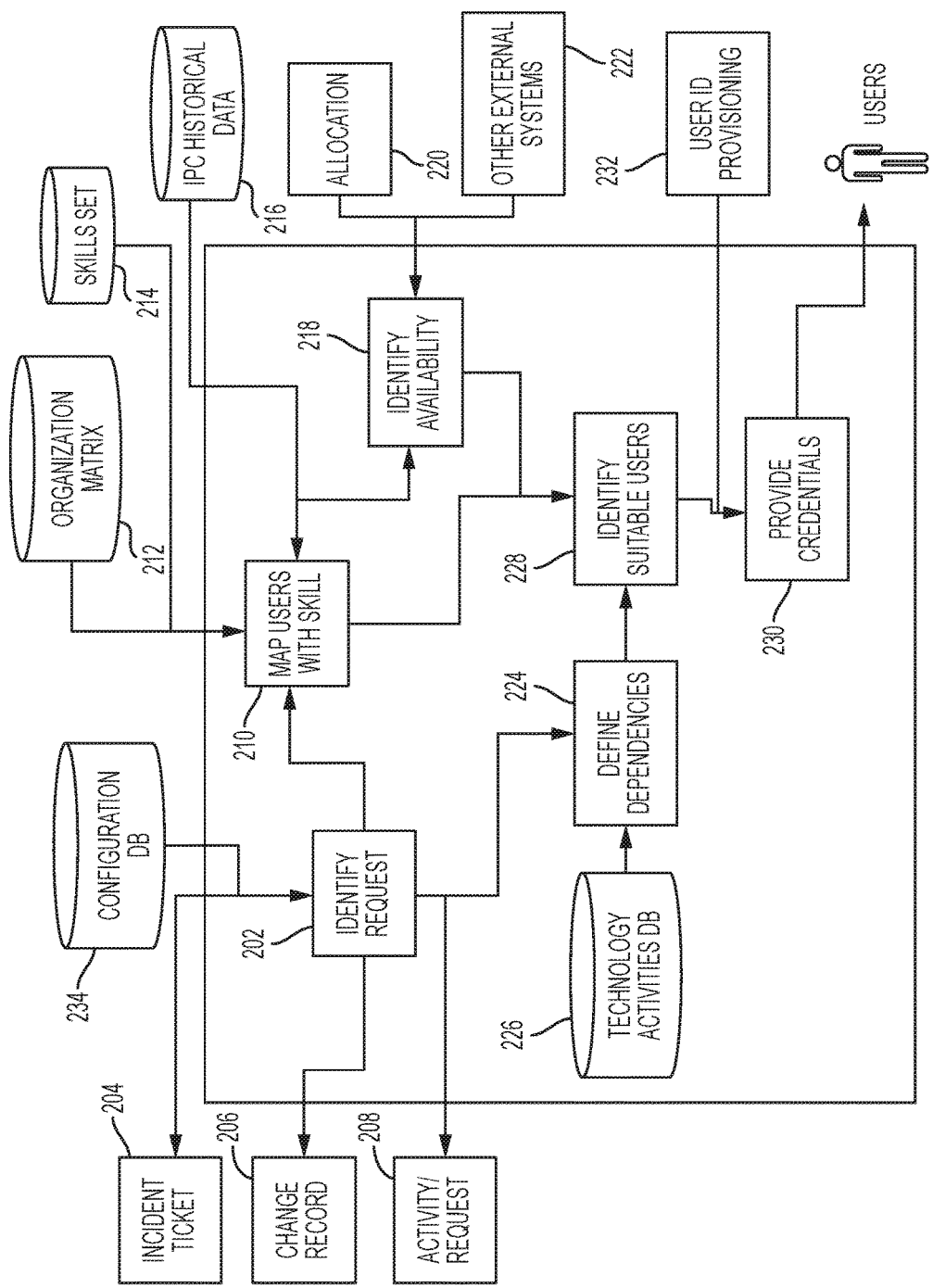
FIG. 2 is a diagram showing component architecture in one embodiment of the present disclosure.

FIG. 2 is a diagram showing component architecture in one embodiment of the present disclosure. Components shown in FIG. 2 may execute on one or more hardware processors. Identify request component 202 receives a request. The request may be identified for example, from a received incident ticket 204, a change record 206, and/or activity or another request 208. An incident ticket 204, for example, may be a problem ticket entered on a computer system that reports or describes a problem that occurred on a computer server. A change record 206 may be a change register entered on a computer system that reports or describes a need to execute a change on a computer server. An activity/request may be a service ticket entered on a computer system that reports or describes the needs to execute an activity on a computer server. This component 202 may also identify the type of request, collect information about the request and categorize the request identifying attributes. In one embodiment, the requests may be received from a plurality of different tools or computer components, to which the identify request component 202 is communicatively coupled or connected. Responsive to receiving a new request, for example, from one or more of the plurality of different tools, the identify request component 202 determines the identity of the tool that sent the request or from which the request is received, and determines whether the request is related to a problem, change or request. The identify request component 202 communicates with the identified tool and obtains from the identified tool attributes or information for proceeding with the request, for example, for performing the work needed to address the request. These attributes or information, for example, may be stored or defined by the individual tools, for example, the identified tool. For example, each tool may have its attributes or information defined for performing the work addressing the request.

Map users with skill component 210 identifies the users who can work on the request based on identified attributes such as skills, experience, availability of users, and/or other information. For example, the map users with skill component 210 may read data from a database storage that stores organization matrix 212 and user skills set 214, and match or determine users that can perform the activities needed to fulfill the request. IPC historical data 216 stores information related to users that have previously worked on the same type of request, problem ticket or change record. Based on the IPC historical data 216, for example, users may be identified that have previously worked on the same type of request, problem ticket or change record. Based on those uses' skills, the skill needed to work in this new request may be identified.

Identify availability component 218 identifies among the selected users (users mapped by the map users with skill component 210) their allocation and availability broken down per activity. For example, once the identify availability component 218 identifies possible or candidate users that can act on the request, the identify availability component 218 identifies which of the candidate users are available to work on the request. With the type of request identified and available users, the identify availability component 218 accesses a different database that can provide user's availability to work on the request at the specific date and time. These databases can be organization's allocation database (220), internal allocation databases or even external systems (222) that can retrieve the user's availability data. In one embodiment, this information can be captured through an application programming interface (API), database selects, extended markup language, and/or others.

Define dependency component 224 breaks down the request into smaller activities and predicts the effort, skill, timeline to execute each activity. For example, this component receives the request and using the technologies activity database (226), this component 224 breaks down the request into smaller activities based on predefined definitions. For instance, the technologies activity database (226) can store data as predefined activities associated with a skill needed and time to execute the activity. As an example, an install database activity may require a skilled resource with X years of experience and takes Y hours.

Identify suitable users component 228 maps the users available to work in each activity (e.g., determined at 218) based on predefined attributes and needs (e.g., determined at 224), and selects the best user to be allocated. For instance, with the list of activities to be performed and the list of all available users, this component can use a matrix of activity x and user's availability time to determine the best affordable users to execute the activity. This matrix may be built to determine a list of available users. For each activity to be performed for the request, the matrix identifies which user can work on it. The matrix can be an in-memory matrix. For example, from the data stored in the in-memory matrix, component at 228 may select the best suitable user to work on an activity and create a credential that allows the user to access a computer component for performing the activity. This may be done for each activity in the request.

Provide credentials component 230 interfaces with user ID management system 232 and provides temporary credentials to selected users. For example, once each activity is defined with an allocated user, this component 230 interacts with the ID management system 232 and orders a temporary user ID credential, for example, by invoking an API call, via XML or direct connection by providing the server name, user ID name and time period. The user ID management system 232 creates and returns the user ID and credential for allowing the user to access the appropriate component of the computer environment for acting on it.

Figure 3:
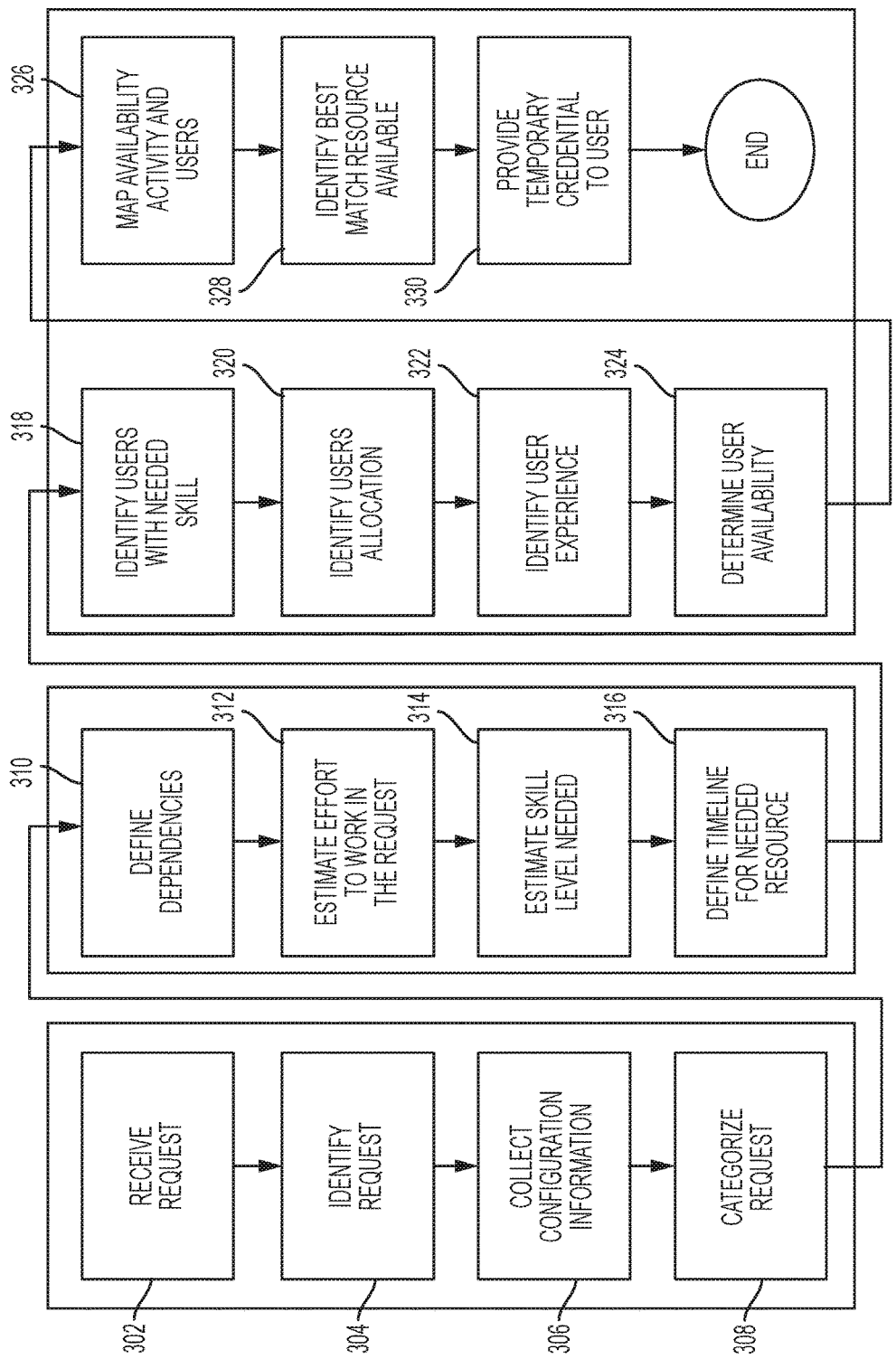
FIG. 3 is a flow diagram illustrating a method of the present disclosure in one embodiment.

FIG. 3 is a flow diagram illustrating a method of the present disclosure in one embodiment. The method may be performed or executed on or by one or more hardware processors. At 302, the method may include receiving a request, e.g., programmed changes, reports to incidents, correction of problems, isolated or programmed activities and emergencies tasks, from various external systems.

At 304, the method may include identifying the type of request and information associated with the request such as hostname, Internet Protocol (IP) address, location, and/or others, to be able to collect configuration data. For example, using attribute fields such as customer name, account name, request identification, and the source of the request (e.g., from which component the request is received), the method may access a configuration database (e.g., FIG. 2 at 234) to determine such configuration data.

At 306, the method may include collecting information data regarding the request such as server configuration, customer configuration, application information, using the information determined at 304. For example, the configuration database may be accessed by invoking a structured query language (SQL) query, API call, XML and/or another extracting technique to obtain attributes fields associated with the request.

At 308, the method may include categorizing the request and determining skill level required to perform the request, urgency and time period for working on the request. For example, the method may compare the request to a previously defined list of activities that are similar or comparable to the request, and identify the skill level needed to perform the request. For example, if the request is a problem ticket related to a full Windows™ disk drive, the method may have it already defined that this request can be performed by a user with intermediate skill and does not take more than 10 minutes. That information can also be captured through IPC historical data from one or more supporting organizations.

At 310, the method may include breaking down the request into basic activities to be performed and building the dependencies between the activities. For instance, a technologies activity database 226 may store a breakdown list of activities per type of request, per technology and the time to perform the activity. For example, for handling the Windows™ Operating System (OS) disk full scenario, the technologies activity database 226 may have defined data which indicates that to solve this problem, the following activities should be performed: 1. identify why Windows™ OS disk became full; 2. clean-up the OS disk; 3. fix the root cause so it does not occur again.

At 312, the method may include predicting the estimated work to be done to fulfill the request based on the activities and dependencies determined at 310. For example, once the request is broken down to activities and the time it takes for completing each activity, the time duration for completing all activities is estimated.

At 314, the method may include predicting the skill level needed to perform each activity. This processing may leverage predefined information and historical information from the organization such as ticket and change records. For example, this information may be captured from the technology activity database 226 and/or industry standard. The information may be refined by checking historical information.

At 316, the method may include predicting the time effort needed to perform each activity. This processing may leverage predefined information and historical information from the organization such as ticket and change records. In this processing, for example, refinement may be performed on each activity based on historical information, for example, retrieving the most recent related activity and checking whether the predicted time is accurate.

In one embodiment, time effort may be defined per skill level. This processing may also predict based on the activities dependency, a timeline to work on the request. For example, the method may include checking all activities and skill levels needed (e.g., defined in the technology activity database 226) and calculating the time effort for a skilled resource to work on each activity. A timeline of each activity per skill is built, and indicates when each skill is needed.

At 318, the method may include identifying users that can work on each activity classifying the activity per skill level. Information can be gathered from sources such as organization's skills database, historical data from change and incident databases and knowledge databases. For example, for each activity to be performed, the method accesses different systems and databases or knowledgebase and searches for users that have the skill need to perform that activity. Searching may include invoking or executing a search query.

At 320, the method may include identifying user's allocation per activity defined, for example, through organization's allocation databases, project management systems, and/or leveraging other systems such as collaboration tools. For example, the method may include accessing different databases to search for user's availability data, interact with a user using a collaboration tool, and/or interact with a user via a social media, and/or search a user's social network postings, to identify user's availability.

At 322, the method may identify user's experience with supporting specific technology and experience with a computer environment, for example, accessed from sources such as organization's skills database, historical data from change and incident system databases and knowledge databases. This information may be identified or accesses by invoking or executing database queries, search strings, API calls, XML, and/or other techniques.

At 324, the method may include determining user's availability per activity based on user's current allocation, for example, the current work or project load and time allocated to the project. For example, the method may refine the list of available users identified at 320, for instance, by accessing different databases to search for user's availability, interacting with a user using a collaboration tool or social media.

At 326, the method may include mapping/allocating each user able to work on an activity considering skills, experience and availability. A list, also referred to as a matrix, of users able to work on the request is built. The list identifies the user with corresponding activity, with identified skills, experience and availability. The list is considered a matrix.

At 328, the method may include identifying the best users available to work on an activity based on skills, availability and experience. For instance, a statistical method or model may be implemented and executed that identifies the best users that can work on the request which maximizes (or optimizes) the performance of, and/or time, for performing the activities.

At 330, the method may include providing to each identified user a temporary credential in order them to work on the activity.

The following is an example use case utilizing a method and/or system of the present disclosure in one embodiment. Consider that in this example, an incident occurred in a computing environment or computer system: For example, a Hypertext Transfer Protocol (HTTP) server has crashed. A monitoring tool identifies that an HTTP daemon (computer process) is down and generates an event. The generated event may include the date and time and the hostname of the server that is detected to be down: E.g., "Jan. 01, 2016 12:00 hostname: httpd server down." The method in one embodiment of the present disclosure accesses a configuration database and retrieves server configuration information such as the operational system that was running the server, asset location, client and application involved, hardware and software inventory, technology related to error message.

For example, the following server configuration may be retrieved.
Server: WINDOWS
Technology: Web server, APACHE
Technology: WINDOWS
Skill level: intermediate
Location: Country X
Action: Incident
Period: immediate The method in one embodiment may also search a user's skill profile database or another database or the like that stores or specifies user skills associated with users, to identify users with Web server/APACHE skill set and the level (e.g., intermediate, as specified). Change and Incident tickets may be accessed to identify users that have worked with Web server/APACHE. An organization's database, for example, may specify or include user's location, working hours, and allocated work or project. Allocation records or database, for example, may specify or include users' availability.

In this example, the method may identify that user's whose skills include working with Web server/APACHE technology and WINDOWS technology. The IDs, location, working hours, projects allocated and skill levels associated with those users are also identified by searching the above-described databases.

For example, the following information may be identified:
Technology (Web server/APACHE)—users' ids, location, working hours, client allocated, skills level;
Technology (WINDOWS)—users' ids, location, working hours, client allocated, skills level.

The method may also determine that the incident requires log analysis and problem determination skills. For example, such information may be predefined rules defined with the method.

The method evaluates which users can act on the activity based on analyzing logs associated with incidents with similar issues. For example, a historical log recorded based on resolution of similar incidents that occurred previously may have information that a user having an expert skill level in Web server/APACHE technology performed a log analysis in a similar incident in 30 minutes, while a user with an intermediate skill level perform the log analysis in 1 hour. The method may identify users from an organization's database having such expert skill level and intermediate skill level in that particular technology. Similarly, the method may discover from historical logs that a user having an intermediate level skill in Web server/APACHE technology performed a problem determination in a similar incident in 1 hour, while a user with expert skill level that that technology performed the problem determination in 30 minutes, and search the organization's database for users with expert and intermediate skill levels in that technology. Likewise, the method may identify from a historical logs that a user having an expert skill level in WINDOWS technology performed a log analysis in a similar incident in 50 minutes, while a user with intermediate skill level performed the similar job in 1.5 hours. The method may identify users from the organization's database having such expert and intermediate skill levels in that particular technology. Similarly, the method may discover from historical logs that a user having an intermediate level skill in WINDOWS technology performed a problem determination in a similar incident in 1.5 hours, while a user with expert skill level in that technology performed the similar activity in 50 minutes, and search the organization's database for users with expert and intermediate skill levels in that technology.

The following data may be obtained from the above-described analysis:

Technology, Activities (Web server/APACHE, log analysis, access-needed, 30 min-expert, 1 hour-intermediate)—user_a, user_b, user_c;

Technology, Activities (Web server/APACHE, problem determination, access-needed, 30 min-expert, 1 hour-intermediate)—user_a, user_c, user_d;

Technology, Activities (WINDOWS, log analysis, access-needed, 50 min-expert; 1:30 hour-intermediate)—user_a, user_e, user_f;

Technology, Activities (WINDOWS, problem determination, access-needed, 50 min-expert, 1:30 hour-intermediate)—user_a, user_e, user_f.

In one embodiment, the method may also identify and order users who can perform the activities based on availability, skill level, accessibility which users can work in the request. In one embodiment, the method may include contacting a user (e.g., via email or another transmission) to check immediate availability. The following information may be identified and ordered:

User_a (WINDOWS: log analysis, problem determination)—skill(advanced), client access(no), availability(immediate);

User_a (WINDOWS: log analysis, problem determination)—skill(advanced), client access(no), availability(immediate);

User_b (Web server/APACHE: problem determination)—skill(advanced), client access(no), availability(immediate);

User_c (Web server/APACHE: log analysis, problem determination)—skill(advanced), client access(no), availability(immediate);

User_d (Web server/APACHE: problem determination)—skill(advanced), client access(no), availability(in 3 hours-3-5 PM CST);

User_e (WINDOWS: log analysis, problem determination)—skill(intermediate), client access(yes), availability (immediate).

The following is an example of the ordered list of users determined based on availability, dependency and skill. In this example, User_a is the preferred user since that user has skills in both needed technology. The second option is user_e to act first identifying problem in WINDOWS and then user_b; user_c (in this order) to act in the Web server/APACHE.

User_a (WINDOWS: log analysis, problem determination)—skill(advanced), client access(no), availability(immediate) AND User_a (Web server/APACHE: log analysis, problem determination)—skill(advanced), client access(no), availability(immediate);

User_b (Web server/APACHE: problem determination)—skill(advanced), client access(no), availability(immediate);

User_c (Web server/APACHE: log analysis, problem determination)—skill(advanced), client access(no), availability (immediate).

In one embodiment, the method may include communicating with or contacting automatically a system of tool that is responsible for creating a temporary credential, for example, accordingly to the predicted time to perform the activities, to the server and forwarding to a selected user, for example, user_a for resolution of problem. In one embodiment, the credential provided enables access only to the needed resources for the user to access, for example, a user that requires access only to Web server/APACHE will not have access to any other resource not related to the Web server/APACHE in the server. In one embodiment, all access and actions performed are stored on an Audit Trail log for future reference and compliance analysis when required.

Figure 4:
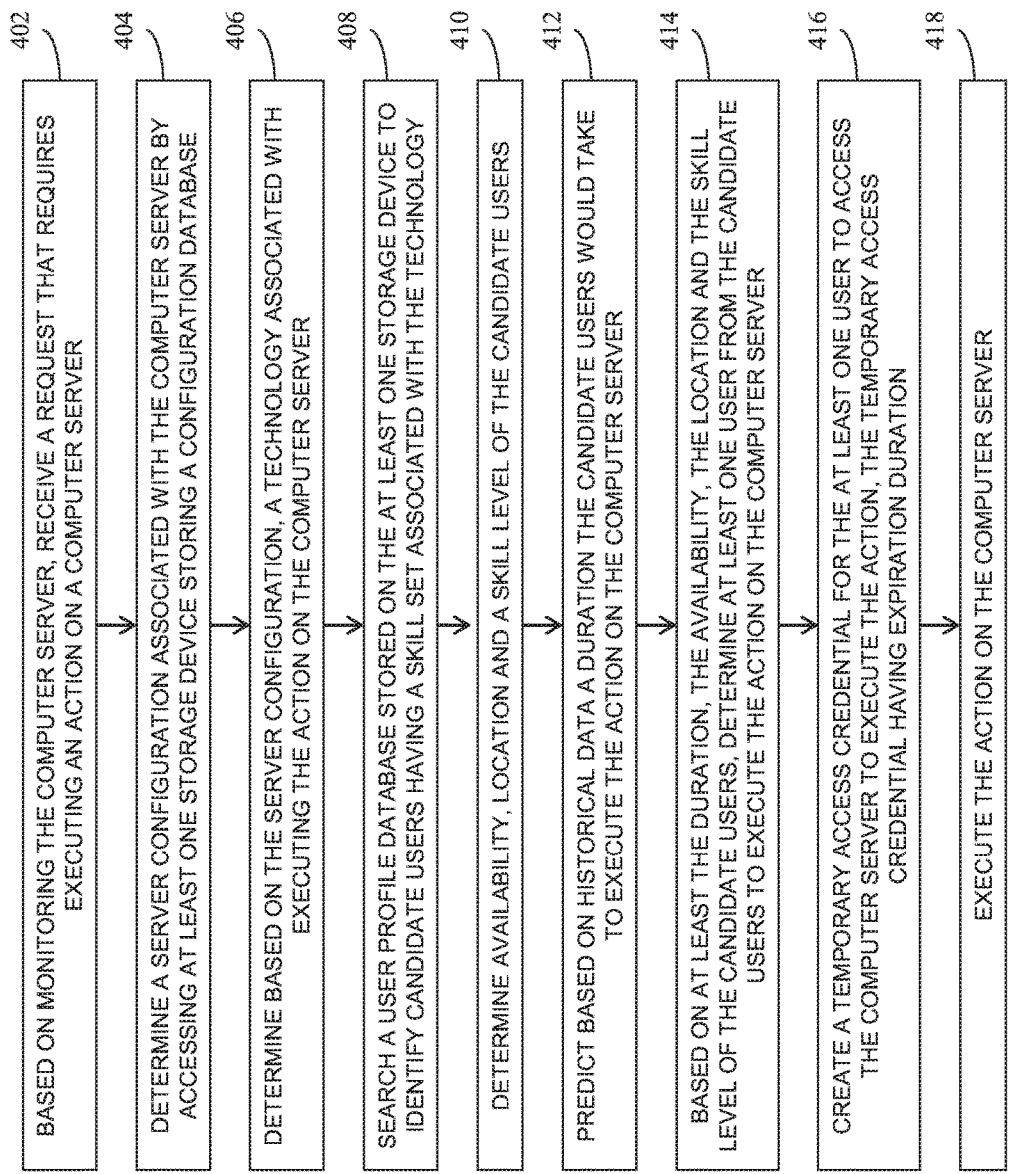
FIG. 4 is another flow diagram showing a method in one embodiment of the present disclosure.

FIG. 4 is a flow diagram showing a method in one embodiment of the present disclosure. At 402, based on monitoring the computer server, a signal comprising a request that requires executing an action on a computer server may be received. An example of the request is an event signaling a ticket incident occurring on the computer server. Another example of the request is an event signaling an update or change needed to the computer server. Other requests such as programmed changes, correction of problems, isolated activities and emergencies tasks, and/or other may be received that need accessing the computer server and performing an action on the computer server.

At 404, a server configuration associated with the computer server may be determined by accessing at least one storage device storing a configuration database. At 406, based on the server configuration, a technology associated with executing the action on the computer server may be determined.

At 408, a user profile database stored on the at least one storage device may be searched to identify candidate users having a skill set associated with the technology. In one embodiment, the action may include a plurality of sub-actions or related actions. For example, the request is analyzed to determine the plurality of sub-actions to execute on the computer server. The candidate users are selected that have a skill set or skill level capable of handling at least one of the sub-actions.

At 410, availability, location and a skill level of the candidate users are determined. At 412, based on historical data a duration the candidate users would take to execute the action on the computer server may be predicted. At 414, based on at least the duration, the availability, the location and the skill level of the candidate users, at least one user may be determined from the candidate users to execute the action on the computer server.

At 416, a temporary access credential is created for the at least one user to access the computer server to execute the action, the temporary access credential having expiration duration. The temporary access credential may be created by interfacing with an authentication system associated with the computer server. In one embodiment, the temporary access credential is determined based on the duration the at least one user takes to execute the action, for example, the temporary access credential is provided with an expiration time that for example covers the duration of the time it would take the selected user to perform the action. At 418, the action may be executed on the computer server.

In one aspect, a method of the present disclosure enables an organization to provide a best type of support with the most skilled and knowledgeable support people and provide credentials to them in a timely manner, for example, accordingly to the urgency of a request. The method, for example, is deployed in a real time fashion to identify the most skilled and available user that could work on a request and provide temporary credentials to perform actions on a computer environment.

Figure 5:
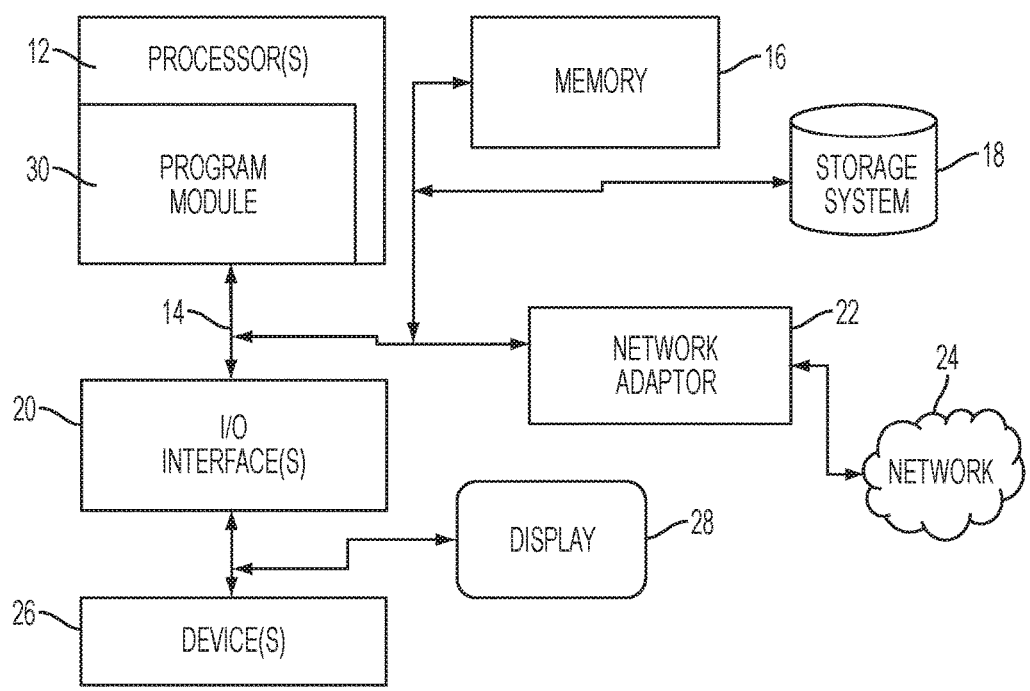
FIG. 5 illustrates a schematic of an example computer or processing system that may implement a temporary access credential provisioning system in one embodiment of the present disclosure.

FIG. 5 illustrates a schematic of an example computer or processing system that may implement a temporary access credential provisioning system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of provisioning temporary access to a computer component, the method performed by at least one hardware processor, the method comprising:
   based on monitoring the computer server, receiving a signal comprising a request that requires executing an action on a computer server;
   determining a server configuration associated with the computer server by accessing at least one storage device storing a configuration database;
   determining based on the server configuration, a technology associated with executing the action on the computer server;
   searching a user profile database stored on the at least one storage device to identify candidate users having a skill set associated with the technology;
   determining availability, location and a skill level of the candidate users;
   predicting based on historical data a duration the candidate users would take to execute the action on the computer server;
   based on at least the duration, the availability, the location and the skill level of the candidate users, determining at least one user from the candidate users to execute the action on the computer server; and
   creating a temporary access credential for the at least one user to access the computer server to execute the action, the temporary access credential having expiration duration, the expiration duration covering a duration of time the at least one user takes to perform the action,
   wherein the temporary access credential is created by interfacing with an authentication system associated with the computer server, and wherein the action is executed on the computer server.

2. The method of claim 1, wherein the action comprises a plurality of sub-actions,
   wherein the request is analyzed to determine the plurality of sub-actions to execute on the computer server, the sub-actions comprising activities and dependencies,
   wherein the candidate users are selected to have the skill level associated with the technology associated with at least one of the sub-actions.

3. The method of claim 1, wherein the request comprises a ticket incident occurring on the computer server.

4. The method of claim 1, wherein the request comprises at least one of:
   making a change in the computer server;
   an alert from a monitoring tool;
   an action scheduled in the computer server; and
   an isolated request.

5. The method of claim 1, wherein the expiration duration of the temporary access credential is determined based on the duration the at least one user takes to execute the action.

6. A computer readable storage medium storing a program of instructions executable by a machine to perform a method of provisioning temporary access to a computer component, the method comprising:
   based on monitoring the computer server, receiving a signal comprising a request that requires executing an action on a computer server;
   determining a server configuration associated with the computer server by accessing at least one storage device storing a configuration database;
   determining based on the server configuration, a technology associated with executing the action on the computer server;
   searching a user profile database stored on the at least one storage device to identify candidate users having a skill set associated with the technology;
   determining availability, location and a skill level of the candidate users;
   predicting based on historical data a duration the candidate users would take to execute the action on the computer server;
   based on at least the duration, the availability, the location and the skill level of the candidate users, determining at least one user from the candidate users to execute the action on the computer server; and
   creating a temporary access credential for the at least one user to access the computer server to execute the action, the temporary access credential having expiration duration, the expiration duration covering a duration of time the at least one user takes to perform the action,
   wherein the temporary access credential is created by interfacing with an authentication system associated with the computer server, and wherein the action is executed on the computer server.

7. The computer readable storage medium of claim 6, wherein the action comprises a plurality of sub-actions, wherein the request is analyzed to determine the plurality of sub-actions to execute on the computer server, wherein the candidate users are selected to have the skill level associated with the technology associated with at least one of the sub-actions.

8. The computer readable storage medium of claim 6, wherein the request comprises a ticket incident occurring on the computer server.

9. The computer readable storage medium of claim 6, wherein the request comprises making a change in the computer server.

10. The computer readable storage medium of claim 6, wherein the expiration duration of the temporary access credential is determined based on the duration the at least one user takes to execute the action.

11. A system of provisioning temporary access to a computer component, comprising:
    at least one hardware processor; and
    at least one storage device;
    the at least one hardware processor, based on monitoring the computer server, receiving a signal comprising a request that requires executing an action on a computer server;
    the at least one hardware processor determining a server configuration associated with the computer server by accessing the at least one storage device storing a configuration database;
    the at least one hardware processor determining based on the server configuration, a technology associated with executing the action on the computer server;
    the at least one hardware processor searching a user profile database stored on the at least one storage device to identify candidate users having a skill set associated with the technology;
    the at least one hardware processor determining availability, location and a skill level of the candidate users;
    the at least one hardware processor predicting based on historical data a duration the candidate users would take to execute the action on the computer server;
    based on at least the duration, the availability, the location and the skill level of the candidate users, the at least one hardware processor determining at least one user from the candidate users to execute the action on the computer server; and the at least one hardware processor creating a temporary access credential for the at least one user to access the computer server to execute the action, the temporary access credential having expiration duration, the expiration duration covering a duration of time the at least one user takes to perform the action, wherein the temporary access credential is created by interfacing with an authentication system associated with the computer server, and wherein the action is executed on the computer server.

12. The system of claim 11, wherein the action comprises a plurality of sub-actions, wherein the request is analyzed to determine the plurality of sub-actions to execute on the computer server, wherein the candidate users are selected to have the skill level associated with the technology associated with at least one of the sub-actions.

13. The system of claim 11, wherein the request comprises a ticket incident occurring on the computer server.

14. The system of claim 11, wherein the request comprises making a change in the computer server.

15. The system of claim 11, wherein the expiration duration of the temporary access credential is determined based on the duration the at least one user takes to execute the action.

* * * * *